United States Patent
Vallala et al.

(10) Patent No.: US 8,625,416 B2
(45) Date of Patent: Jan. 7, 2014

(54) VERIFYING COMMUNICATION REDUNDANCY IN A NETWORK

(75) Inventors: Vijay Vallala, North Andover, MA (US); Kenneth Lee, Cambridge, MA (US); Alen Mehmedagic, Wilmington, MA (US)

(73) Assignee: Schneider Electric Industries SAS (FR)

( * ) Notice: Subject to any disclaimer, the term of this patent is extended or adjusted under 35 U.S.C. 154(b) by 211 days.

(21) Appl. No.: 13/339,836

(22) Filed: Dec. 29, 2011

(65) Prior Publication Data
US 2013/0170337 A1 Jul. 4, 2013

(51) Int. Cl.
*H04L 12/26* (2006.01)
*H04L 12/28* (2006.01)
*G06F 11/00* (2006.01)

(52) U.S. Cl.
USPC ........... 370/229; 370/252; 370/258; 370/403; 714/100

(58) Field of Classification Search
USPC ................. 370/229–240, 252–258, 310–350, 370/395.2–395.43, 400–410; 714/100, 714/1–6.3, 39–41, 48–57
See application file for complete search history.

(56) References Cited

U.S. PATENT DOCUMENTS

| | | | | |
|---|---|---|---|---|
| 6,717,922 | B2 * | 4/2004 | Hsu et al. | 370/258 |
| 8,184,527 | B2 * | 5/2012 | Ling et al. | 370/216 |
| 8,274,919 | B2 * | 9/2012 | Florit et al. | 370/256 |
| 2009/0262643 | A1 * | 10/2009 | Zhao et al. | 370/217 |
| 2011/0228669 | A1 * | 9/2011 | Lei et al. | 370/219 |

OTHER PUBLICATIONS

"Media Access Control (MAC) Bridges" IEEE Standard for Local and Metropolitan Area Networks, Jun. 9, 2004, pp. 1-280, IEEE, New York, NY.

* cited by examiner

*Primary Examiner* — Tri H Phan
(74) *Attorney, Agent, or Firm* — Banner & Witcoff, Ltd.

(57) ABSTRACT

Apparatuses, methods, and computer-readable media support diagnosing a communications network using a network protocol that ensures a loop-free topology to prevent bridge loops. One of the network devices is identified as a selected device in a network ring, where the selected device interacts with the network ring through first and second ports. The values of some of the parameters of the selected device are modified to be distinguishable from that of any network device in the ring, and diagnostics about the functioning of the network protocol are then performed to obtain state information about the first and second ports. When one of the ports is determined to be in the blocking state, network redundancy for the network ring is verified. However, when neither of the ports is not in the blocking state, a redundancy problem may be detected.

20 Claims, 5 Drawing Sheets

| TABLE 1: EtherNet/IP (EIP Object) |||||
|---|---|---|---|---|
| Attr ID | Access Rule | Name | Data Type | Description of the attributes |
| 01h | Get | Switch Status | STRUCT of | |
| | | Protocol Specification | UINT | Refer to RFC-4188 |
| | | Bridge Priority | UDINT | Refer to RFC-4188 |
| | | Time Since Topology Change | UDINT | Refer to RFC-4188 |
| | | Topology Change Count | UDINT | Refer to RFC-4188 |
| | | Designated Root | String | Refer to RFC-4188 |
| | | Root Cost | UDINT | Refer to RFC-4188 |
| | | Root Port | UDINT | Refer to RFC-4188 |
| | | Max Age | UINT | Refer to RFC-4188 |
| | | Hello Time | UINT | Refer to RFC-4188 |
| | | Hold Time | UDINT | Refer to RFC-4188 |
| | | Forward Delay | UINT | Refer to RFC-4188 |
| | | Bridge Max Age | UINT | Refer to RFC-4188 |
| | | Bridge Hello Time | UINT | Refer to RFC-4188 |
| | | Bridge Forward Delay | UINT | Refer to RFC-4188 |
| 02h | Get Clear | Port Status | STRUCT of | |
| | | Port | UDINT | Refer to RFC-4188 |
| | | Priority | UDINT | Refer to RFC-4188 |
| | | State | UINT | INTEGER { disabled(1), blocking(2), listening(3), learning(4), forwarding(5), broken(6) } |
| | | Enable | UINT | Refer to RFC-4188 |
| | | Path Cost | UDINT | Refer to RFC-4188 |
| | | Designated Root | String | Refer to RFC-4188 |
| | | Designated Cost | UDINT | Refer to RFC-4188 |
| | | Designated Bridge | String | Refer to RFC-4188 |
| | | Designated Port | String | Refer to RFC-4188 |
| | | Forward Transitions Count | UDINT | Refer to RFC-4188 |

VERIFYING COMMUNICATION REDUNDANCY IN A NETWORK

BACKGROUND

Without proper network redundancy, a network failure occurring within a networked automation and control infrastructure may result in a sudden and unexpected production stoppage. For example, the time, effort, and costs associated with recovery, repairs, and restarting a production line after a sudden outage may be significant for a company. Whether a plant is involved in discrete or process operations, ensuring that production runs smoothly and uninterrupted is important to the bottom line.

Network redundancy is akin to an insurance policy for industrial networks. Acting as a quick-response backup system, one of the goals of network redundancy is to mitigate the risk of unplanned outages and ensure continuity of operation by instantly responding to and reducing the effects of a point of failure anywhere along the critical data path. When one considers the direct and indirect costs of unplanned downtime, it becomes clear that making the investment in network redundancy is typically a smart strategy.

A redundant network topology, in conjunction with a redundancy protocol, is typically designed to ensure that networks continue to function in the presence of single points of failure. Network redundancy works by creating multiple data paths within a network, between any and all locations. If a cable, switch, or router suddenly fails, another pathway may be available to maintain the communication flow. Any interruptions that are caused by a failure should be as short as possible, in which reliability is increased by redundancy. A network that is based on switches or bridges will typically introduce redundant links between those switches or bridges to overcome the failure of a single link. While the use of industrial-grade network components, such as ruggedized switches and hardened or armored cables, alleviates the potential for damage or breakage of parts. A network benefits from redundancy only if the network is correctly configured with redundant paths.

An operator of an automation and control system may assume that the network is properly configured for redundancy, only to discover later that it is not when a single failure actually occurs in the network. Moreover, even if an automation and control system is properly configured, but due to a variety of reasons, network redundancy may be lost due to a variety of reasons. For example, a user may inadvertently forget to connect a cable between two devices or a cable may break after installation. Consequently, an improved method and system for verifying redundancy would be beneficial.

SUMMARY

An aspect of the invention provides apparatuses, computer-readable media, and methods for diagnosing a communications problem such as a cable break or a missing cable in an Ethernet network utilizing Spanning Tree Protocol (STP) or Rapid Spanning Tree Protocol (RSTP) in a ring (loop) topology. The time for evaluating the network may be quicker and simpler than with traditional systems.

In another aspect of the invention, one of the network devices may be selected in a network ring, where the selected device interacts with the ring through a first and a second port. The network devices in the network ring may be configured with default parameters specified in a network protocol (e.g., Spanning Tree Protocol (STP) or Rapid Spanning Tree Protocol (RSTP)) that ensures a loop-free topology to prevent bridge loops for the network ring. The values of some of the parameters (e.g., the bridge priority and/or port pathcost) of the selected device can be modified to be larger or smaller than that of any network device in the network ring, and diagnostics about the functioning of the network protocol for the selected device are then performed to obtain state information about the first and second ports of the selected device. When one of the ports is determined to be in the blocking state, network redundancy for the network ring may be verified. However, when neither of the ports is not in the blocking state, a redundancy problem may be detected for the network ring.

In yet another aspect of the invention, state information about the selected device's ports may be obtained by accessing software objects (e.g., EtherNet/IP (EIP) objects) from the selected device, in which state information for each port corresponds to a separate instance of the software object.

Moreover, in another aspect of the invention, network redundancy may be verified for a network comprising more than one network ring, where each ring is configured with a separate STP/RSTP domain. Each ring can be separately evaluated by identifying a selected device in a particular network ring to obtain state information about the selected device's ports.

BRIEF DESCRIPTION OF THE DRAWINGS

A more complete understanding of the present disclosure and the advantages thereof may be acquired by referring to the following description in consideration of the accompanying drawings, in which like reference numbers indicate like features and wherein.

DETAILED DESCRIPTION

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Figure 1:
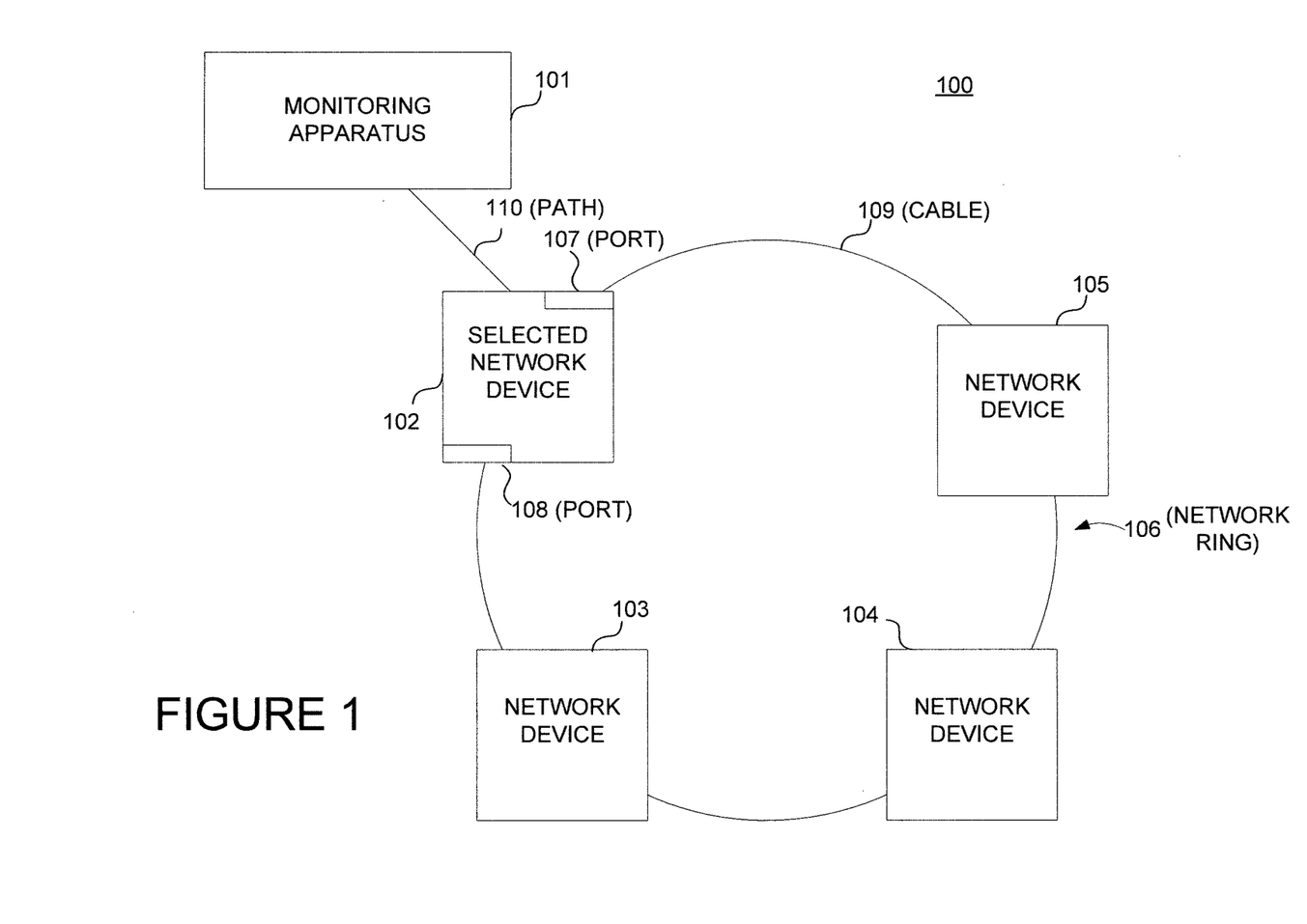
FIG. 1 shows a network configuration for verifying communication redundancy for a ring typology in accordance with various aspects of the disclosure.
Figure 4:
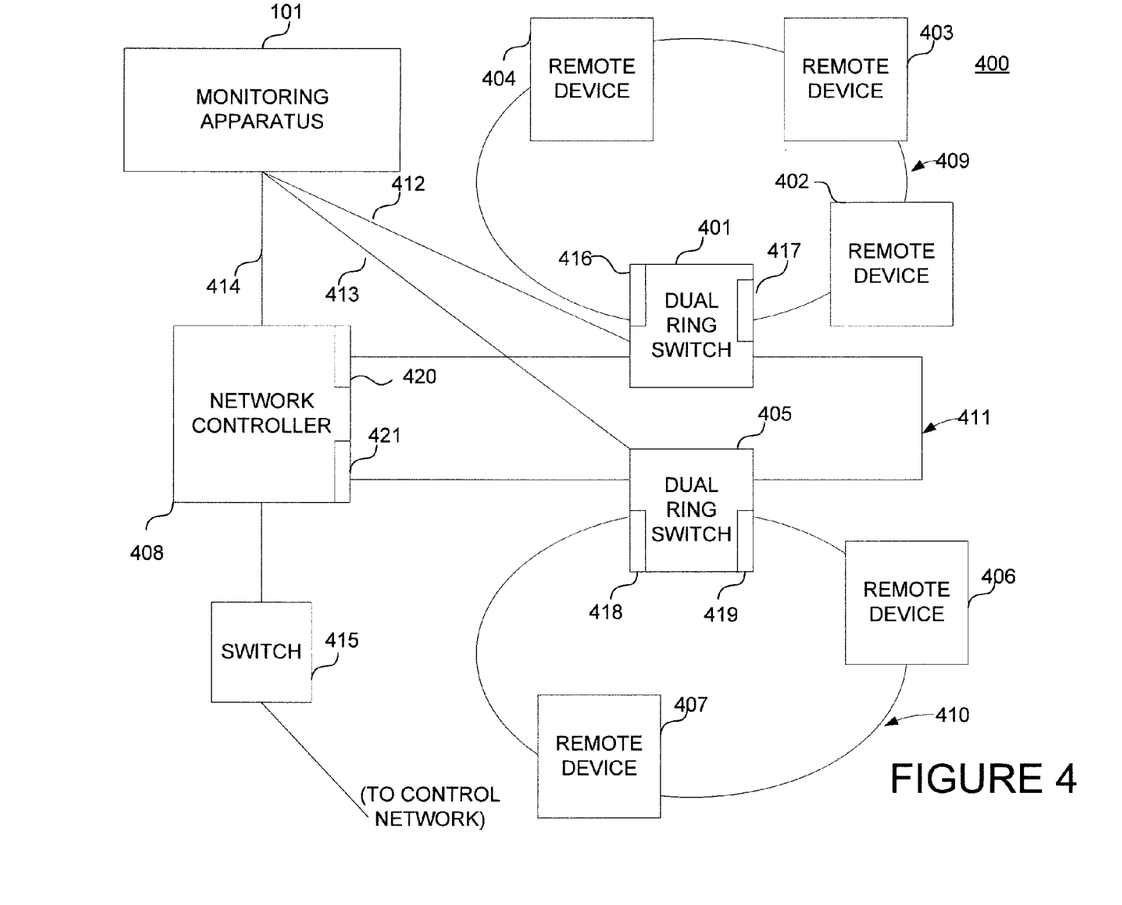
FIG. 4 shows a configuration for verifying communication redundancy for a system with remote I/O devices in accordance with various aspects of the disclosure.

FIG. 1 shows network configuration 100 for verifying communication redundancy for a ring typology in accordance with an embodiment of the disclosure. In an aspect of the disclosure, ring network 106 is characterized by a network topology in which each node 102-105 connects to neighboring nodes, forming a single continuous pathway for signals through each node through ring 106. Data travels from node to node, with each node along the way handling every packet. For example, a node may process a packet or may allow the packet to pass through without any processing of the packet. Network ring 106 typically comprises a set of bidirectional links between each pair of network devices using optical fiber and/or copper-based communications. Network devices may comprise different device types such as remote device 402, dual ring switch 401, and network controller 408 as shown in FIG. 4. (Network controller 408 is typically a device controlling and/or communicating with the remote devices.) With some of the embodiments of the disclosure, each of the network devices supports Spanning Tree Protocol (STP) or Rapid Spanning Tree Protocol (RSTP). Message traffic between network devices is typically dispatched in the direction of the lowest cost and/or shortest path towards its destination. In the event of the loss of a link (e.g., a cable is broken or not configured in the network), the two nearest surviving devices loop back their ends of the ring. In this way, traffic can still travel to all surviving parts of the ring, even if it has to travel the long way around ring 106.

In ring network 106, every device 102-105 may have two neighbors for communication purposes. For example, network device 105 may have neighboring devices such as network devices 104 and 107. Messages may travel through ring 106 in one of the directions (i.e., either clockwise or counterclockwise), where each path is bidirectional. However, when a cable or device becomes inoperative between two devices in the ring, the two devices may communicate in the other direction around network ring 106 if ring 106 is properly configured. For example, devices 103 and 105 can communicate with each other even if the path through device 104 becomes inoperative by communicating through device 102. However, if a cable has not been configured in ring 106, communication in ring 106 may fail if one of the paths becomes inoperative. If cable 109, for example, were not included during network installation and the path through device 104 were inoperative, devices 103 and 105 would not be able to communicate with each other.

System verification of network redundancy may be desirable to detect the physical and operational integrity of the network ring. System verification may detect cable breaks and device failure or fault (due to lack of power, defect, etc.).

In an aspect of the disclosure, monitoring apparatus 101 may determine whether network ring 106 is properly configured with network redundancy by querying selected network device 102 through communication path 110 about two ports (e.g., ports 107 and 108) that connect selected device 102 to network ring 106. With some embodiments, monitoring apparatus 101 communicates with selected device 102 through path 110 using EtherNet/IP and/or Simple Network Management Protocol (SNMP). Path 110 may include separate communication facilities from ring 106, may share facilities with ring 106, or may be located on ring 106 (e.g., as one the network devices 102-105). Consequently, monitoring apparatus 101 may be different from the network devices located in network ring 106 or may be incorporated into one of the network devices (e.g., a network controller).

In some embodiments, monitoring apparatus 101 queries selected device 102 about diagnostic results of its network operation within network ring 106. In an aspect of the disclosure, various different protocols may be used within network ring 106, including Spanning Tree Protocol (STP) or Rapid Spanning Tree Protocol (RSTP) for the ring (loop) topology. For example, RSTP is commonly used as the network redundancy protocol in an industrial Ethernet network. In particular, ring topology may be desirable in terms of predictable performance and also guaranteed redundancy from network issues.

Figure 2:
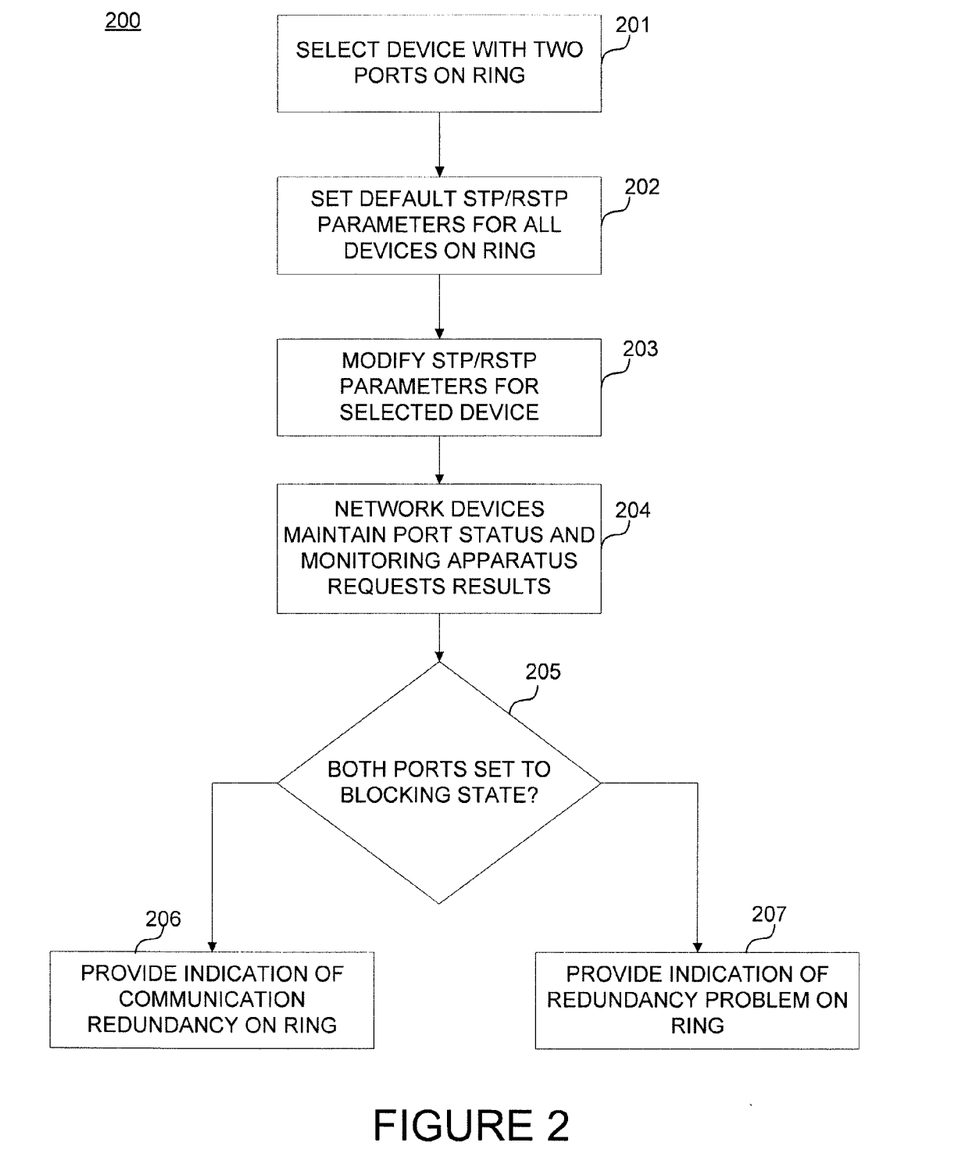
FIG. 2 shows a process for verifying communication redundancy in a network in accordance with various aspects of the disclosure.

FIG. 2 shows a flowchart 200 for verifying communication redundancy in a network in accordance with an embodiment of the disclosure. In FIG. 2, the physical and operational integrity of an Ethernet network utilizing STP or RSTP protocols in a ring (loop) topology may be determined. In an aspect of the disclosure, network ring 106 may be assessed without modifications to the existing STP and RSTP standard, e.g., IEEE Standard 802.1D™-2004 (IEEE Standard for Local and Metropolitan Area Networks: Media Access Control (MAC) Bridges). With some embodiments, as will be further discussed, devices 102-105 perform diagnostics as supported by the STP and/or RSTP standards.

In an embodiment illustrated in FIG. 2, monitoring apparatus 101 identifies which of the network devices on ring 106 is the selected device in block 201. The identification may be performed in a number of ways. For example, the identification of the selected device may be obtained from input data by monitoring apparatus 101. Alternatively, or in combination with the input data, monitoring apparatus 101 may obtain network parameters for devices 102-105 and identify the selected device by determining which device has distinguishable parameter values, e.g., the largest values with respect to the other network devices. Referring to FIG. 1, selected device 102 is chosen in ring 106 so that monitoring apparatus 101 may verify the redundancy of ring 106. The selected device should typically have a central role and/or always be present in the operation of ring 106 such that if the selected device is not present, the ring may not operate properly. Examples of a selected device include the controller (of the devices on the ring) and the switch/bridge that connects the ring to other parts of the network. However, the selected device is typically not the root device in the STP/RSTP network in order to ensure that one of the ports is in the blocked state as will be further discussed.

At block 202, the STP/RSTP parameters of each network device 102-105 in ring 106 may be set to default values that may be specified in in the STP/RSTP standards document. The parameters may be set by configuration software through a number of ways. For example, the parameters of a network device may be configured by a user through a touch screen interface, downloaded from a configuration file server, or obtained from non-volatile memory of the device. At block 203, STP/RSTP parameters may be modified for the selected device The STP/RSTP parameters may be modified in a number of ways. For example, the modified parameter values may be sent from another device (e.g., monitoring apparatus 101) using File Transfer Protocol (FTP). With some embodiments the bridge priority parameter of selected device 102 is modified to a value greater than the values that are used by devices 103-105 in the ring 106, where bridge priority of device 102 is set to 61440 while bridge priority of other devices 103-105 is set to 32768, which is the default value. Also, the port pathcost parameter of the two ports (e.g., ports 107 and 108 of selected device 102) connected to ring 106 is modified to a value larger than the values that correspond to the data rates used in the ring. For example, port pathcost may be set to 200,000,000. Other STP/RSTP parameters may be modified to the extent that the parameter values do not disturb proper operation in the ring topology. Modification of the STP/RSTP parameters forces either of the two ports of selected device 102 to be in a blocking state (as determined at blocks 204-205) if ring 106 is intact with proper redundancy and all network devices 102-105 are operational. A port may be determined to be in the blocking state, when no data is normally sent or received through the port but the port may go into the forwarding mode if other links in use were to fail. Consequently, if one of the paths were to fail, the port may transition into a forwarding mode to utilize the network redundancy to compensate for the network failure.

At block 204, monitoring apparatus 101 queries selected device 102 about the state of the ports with the modified STP/RSTP parameters. In an embodiment, devices 102-105 maintain port status based on STP/RSTP operation, and selected device 102 may report diagnostic results about its STP/RSTP operation to monitoring apparatus 101. The diagnostic data, which may include information about the port states, can be exposed through one of a number of reporting mechanisms, e.g., via SNMP, EtherNet/IP, or Modbus.

Figure 3:
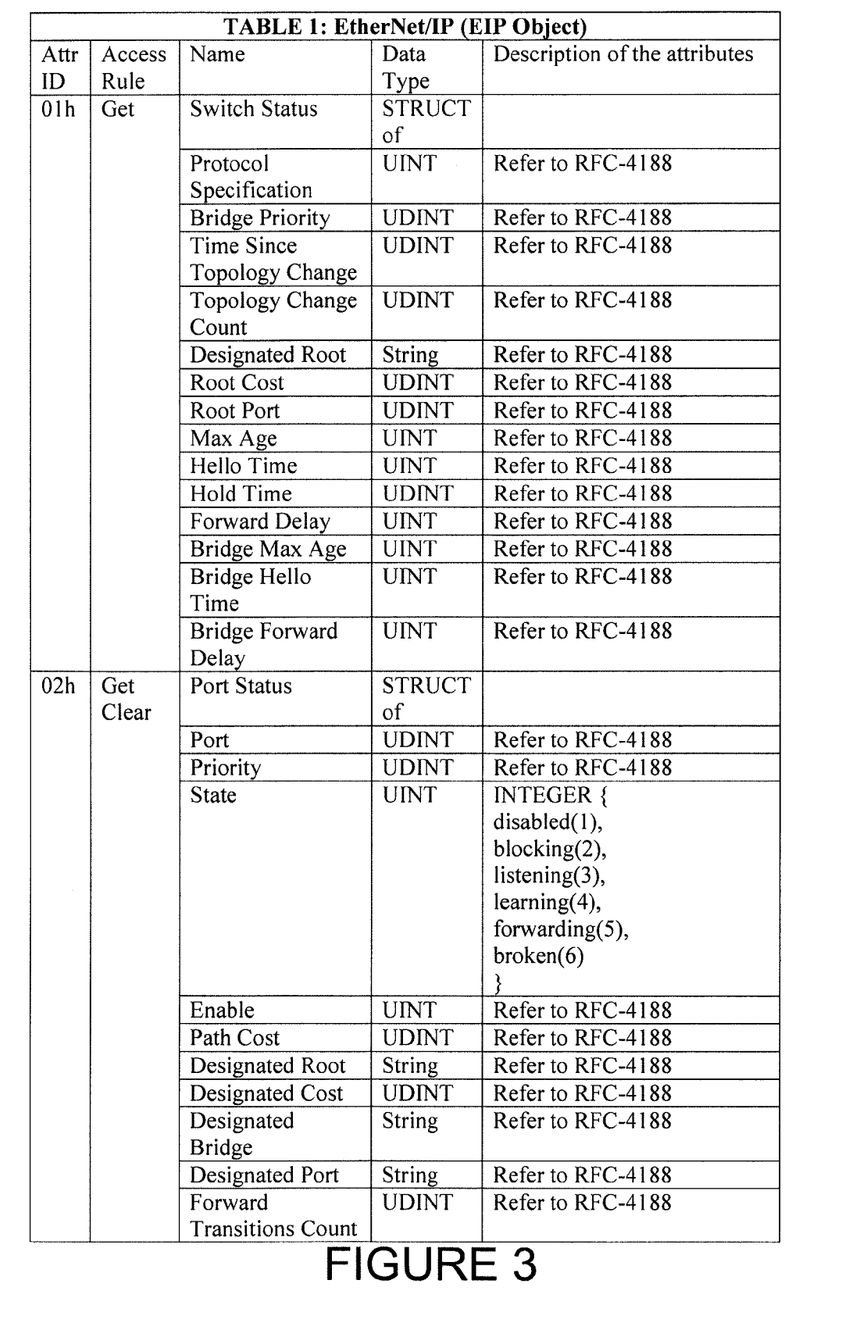
FIG. 3 shows a table representing an EtherNet/IP (EIP) object in accordance with various aspects of the disclosure.

Related information about the state of ports may be available with STP/RSTP-capable devices via various means, including EtherNet/IP and SNMP. For example, information about a port state may be obtained with EtherNet/IP explicit messaging. Using explicit messaging, monitoring apparatus 101 may query selected device 102 about an EtherNet/IP (EIP) object (as shown in FIG. 3), where there is an instance for every port on a network device. The state or a particular port of the device may be obtained from the state of the port status. As shown in FIG. 3, possible port states may include disabled, blocking, listening, learning, forwarding, and broken with corresponding integer values of 1-6, respectively. To complete the diagnostics of ring 106, in order to query about the states of two ports, two instances of the EIP object should be read.

At block 205, monitoring apparatus 101 may determine whether ports 107 or 108 (as shown in FIG. 1) is in the blocking state (corresponding to state=2 of the port status as shown in FIG. 3). If the state of either of ports 107 or 108 is set to the blocking state, then the ring 106 may be deemed to be intact and there is network redundancy to each device in the ring. In such a case, monitoring apparatus 101 generates an indication (for example to the user) that ring 106 has the desired redundancy. However, if the state of neither of the ports is set to the blocking state, then the ring 106 may not be intact, and a problem may exist with network redundancy. In such a case, monitoring apparatus 101 may generate a different indication that there is a network redundancy problem with ring 106.

FIG. 4 shows network configuration 400 for verifying communication redundancy for a system with remote I/O devices in accordance with an embodiment of the disclosure. Network configuration 400 comprises rings 409, 410, and 411 and may further include additional network topological entities (e.g., bus, star, mesh, and/or tree) that may be connected via switch 415. Network ring 409 includes dual ring switch 401 and remote devices 402-404; network ring 410 includes dual ring switch 405 and remote devices 406-407; and network ring 411 includes network controller 408 and dual ring switches 401 and 405. Dual ring switch 401 supports switching for rings 409 and 411, and dual ring 405 supports switching for rings 410 and 411, where rings 409, 410, and 411 are configured for separate STP/RSTP domains.

Monitoring apparatus 101 verifies network redundancy of each ring 409-411 by querying a selected device in each ring corresponding to dual ring switch (DRS) 401, dual ring switch 405, and network controller 408 (which may be referred as a programmable logic controller (PLC)) through communication paths 412, 413, and 414, respectively. The selected device may be a unique device in the ring. For example, if remote devices 402-404 were the same type of devices, dual ring switch 401 may be selected as the selected device so that remote devices 402-404 would be configured with the same STP/RSTP parameter values as the default values. As previously discussed, the selected device for a network ring should typically have a central role in the operation of the ring such that if the selected device is not present, the ring would not operate properly. A different device other than network controller 408 may be selected for ring 411 based on the above criterion.

In some embodiments, monitoring apparatus 101 separately verifies the redundancy of each ring 409-411 through communication paths 412-414, respectively. For example, verification of ring 411 may be first performed followed by the verification of rings 409 and 410. Ring 411 functions as the main network because ring 411 includes network controller 408, while rings 409 and 410 function as remote I/O leafs. In order to verify the redundancy of each ring, monitoring apparatus 101 may determine whether the network ring 409, 410, or 411 is properly configured with network redundancy by querying selected network device 401, 405, or 408 about two ports (416-417, 418-419, and 420-421) that connect the selected device with the corresponding network ring. Also, monitoring apparatus 101 may verify a double ring by evaluating each ring separately.

Figure 5:
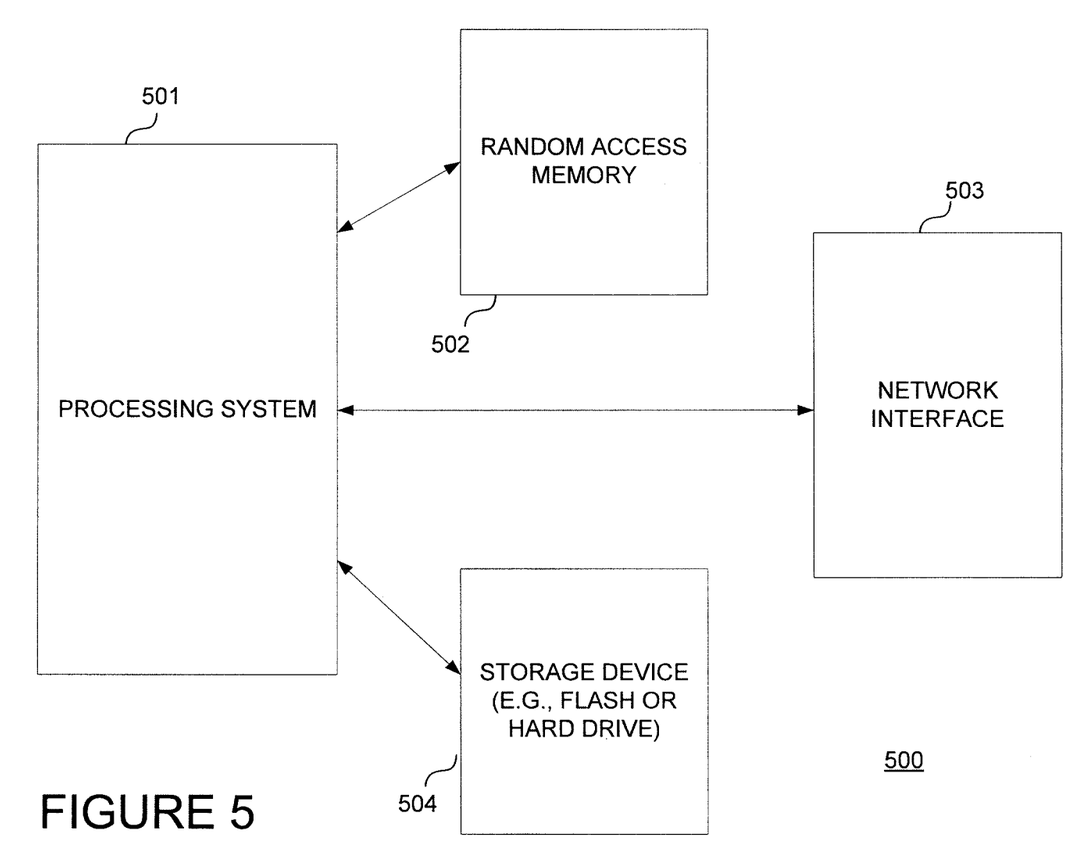
FIG. 5 shows a block diagram for a monitoring apparatus in accordance with various aspects of the disclosure.

FIG. 5 shows block diagram 500 for monitoring apparatus 101 in accordance with an embodiment of the disclosure. Processing system 501 may execute computer executable instructions from a computer-readable medium (e.g., storage device 504) in order provide verify communication redundancy for a network, Memory 502 is typically used for temporary storage while storage device 504 may comprise a flash memory and/or hard drive for storing computer executable instructions and a profile image. However, computer storage media may include volatile and nonvolatile, removable and non-removable media implemented in any method or technology for storage of information such as computer readable instructions, data structures, program modules or other data. Computer storage media include, but may not be limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processing system 801. The executable instructions may carry out any or all of the method steps described herein.

With some embodiments, processing system 501 may correspond to one or more processors and storage device 504 may correspond to one or more memories.

Apparatus 101 may be implemented as one or more ASICs or other integrated circuits having instructions for performing operations as described in connection with one or more of any of the embodiments described herein. Said instructions may be software and/or firmware instructions stored in a machine-readable medium and/or may be hard-coded as a series of logic gates and/or state machine circuits in one or more integrated circuits and/or in one or more integrated circuits in combination with other circuit elements.

As can be appreciated by one skilled in the art, a computer system with an associated computer-readable medium containing instructions for controlling the computer system may be utilized to implement the exemplary embodiments that are disclosed herein. The computer system may include at least one computer such as a microprocessor, digital signal processor, and associated peripheral electronic circuitry.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. An apparatus comprising:
   at least one memory; and
      at least one processor coupled to the at least one memory and configured to perform, based on instructions stored in the at least one memory:
      identifying a first selected device of a first plurality of devices in a first network ring, wherein:
         the first selected device interacts with the first network ring through a first port and a second port;
         a first parameter is specified by a network protocol, wherein the network protocol ensures a loop-free topology to prevent bridge loops for the first network ring; and
         a first parameter value of the first parameter for the first selected device is distinguishable from a value of any device of the first plurality of devices in the first network ring;
      querying the first selected device about an operation of the first selected device in the first network ring with the network protocol;
      when one of the first port and the second port is in a blocking state, generating a first indicator that indicates network redundancy with the first network ring; and
      when the first port and the second port are not in the blocking state, generating a second indicator that indicates a redundancy problem with the first network ring.

2. The apparatus of claim 1, wherein the network protocol comprises one of a spanning tree protocol (STP) and a rapid spanning tree protocol (RSTP).

3. The apparatus of claim 2, wherein:
   the first parameter comprises a bridge priority of the first selected device; and
   a bridge priority value for the first selected device is larger than for any other device of the first plurality of devices.

4. The apparatus of claim 3, wherein:
   a second parameter is specified by the network protocol and comprises a port pathcost parameter; and
   a port pathcost value for the first selected device is larger than for any other device.

5. The apparatus of claim 1, wherein the first selected device comprises a remote input/output (I/O) device.

6. The apparatus of claim 1, wherein the first selected device comprises a dual ring switch.

7. The apparatus of claim 1, wherein the first selected device comprises a network controller.

8. The apparatus of claim 1, wherein the at least one processor is configured to perform:
   modifying at least one parameter for the first selected device to a changed value that is distinguishable from the value of any said device.

9. The apparatus of claim 1, wherein the at least one processor is configured to perform:
   querying a second selected device about a network operation of the second selected device in a second network ring; and
   in response to the querying, verifying network redundancy for the second network ring.

10. The apparatus of claim 1, wherein the at least one processor is configured to perform:
    obtaining a first and a second software object from the first selected device for the first and second ports, respectively; and
    determining a port state for each port from the obtained software objects.

11. The apparatus of claim 10, wherein each of the software objects comprises an EtherNet/IP (EIP) object.

12. The apparatus of claim 11, wherein the determining utilizes state data contained in the EIP object.

13. The apparatus of claim 1, wherein the at least one processor is configured to perform:
    distinguishing the first selected device from the first plurality of devices based on at least the first parameter.

14. A method for verifying network redundancy for a network, comprising:
    identifying a selected device of a plurality of devices in a network ring, wherein:
       the selected device interacts with the network ring through a first port and a second port;
       a first parameter and a second parameter are specified by a network protocol, wherein the network protocol ensures a loop-free topology to prevent bridge loops for the network ring; and
       a first parameter value of the first parameter and a second parameter value of the second parameter for the selected device are distinguishable from values of any device of the plurality of devices in the network ring;
    querying the selected device about an operation of the selected device in the network ring with the network protocol;
    when one of the first port and the second port is in a blocking state, generating a first indicator that indicates network redundancy with the network ring; and
    when the first port and the second port are not in the blocking state, generating a second indicator that indicates a redundancy problem with the network ring.

15. The method of claim 14, further comprising:
    modifying the first parameter and the second parameter for the selected device to a first modified value and a second modified value, respectively, that are larger than values of any device of the plurality of devices in the network ring.

16. The method of claim 14, wherein:
    the network protocol comprises one of a spanning tree protocol (STP) and a rapid spanning tree protocol (RSTP);
    the first parameter comprises a bridge priority; and
    the second parameter comprises a port pathcost for the first port and the second port.

17. The method of claim 14, further comprising:
    obtaining a first and a second software object from the selected device for the first and second ports, respectively; and
    determining a port state for each port from the obtained software objects.

18. An apparatus comprising:
    at least one memory; and
    at least one processor coupled to the at least one memory and configured to perform, based on instructions stored in the at least one memory:
    identifying a selected device of a plurality of devices in a network ring, wherein:
       the selected device interacts with the network ring through a first port and a second port;
       a bridge priority parameter and a port pathcost parameter are specified by one of a spanning tree protocol (STP) and a rapid spanning tree protocol (RSTP); and a bridge priority value of the bridge priority parameter for the selected device and a port pathcost value of the port pathcost parameter are larger than values of any device of the plurality of devices in the network ring;

obtaining a first and a second software object from the first selected device for the first and second ports, respectively;

determining a port state for each port from the obtained software objects;

when one of the first port and the second port is in a blocking state, generating a first indicator that indicates network redundancy with the network ring; and when the first port and the second port are not in the blocking state, generating a second indicator that indicates a redundancy problem with the network ring.

19. A non-transitory computer-readable storage medium storing computer-executable instructions that, when executed, cause at least one processor to perform operations comprising:

identifying a selected device of a plurality of devices in a network ring, wherein:

the selected device interacts with the network ring through a first port and a second port;

a first parameter and a second parameter are specified by a network protocol, wherein the network protocol ensures a loop-free topology to prevent bridge loops for the network ring; and a first parameter value of the first parameter and a second parameter value of the second parameter for the selected device are distinguishable from values of any device of the plurality of devices in the first network ring;

querying the selected device about an operation of the selected device in the network ring with the network protocol;

when one of the first port and the second port is in a blocking state, generating a first indicator that indicates network redundancy with the network ring; and when the first port and the second port are not in the blocking state, generating a second indicator that indicates a redundancy problem with the network ring.

20. The computer-readable medium of claim 19, wherein the computer-executable instructions, when executed, cause the at least one processor to perform:

obtaining a first and a second software object from the selected device for the first and second ports, respectively; and determining a port state for each port from the obtained software objects.

* * * * *